United States Patent
MacLennan

(10) Patent No.: US 10,272,508 B2
(45) Date of Patent: *Apr. 30, 2019

(54) SAW TOOTH

(71) Applicant: Stephen MacLennan, St-Lazare (CA)

(72) Inventor: Stephen MacLennan, St-Lazare (CA)

( * ) Notice: Subject to any disclaimer, the term of this patent is extended or adjusted under 35 U.S.C. 154(b) by 389 days.

This patent is subject to a terminal disclaimer.

(21) Appl. No.: 15/088,371

(22) Filed: Apr. 1, 2016

(65) Prior Publication Data

US 2016/0288229 A1    Oct. 6, 2016

Related U.S. Application Data

(60) Provisional application No. 62/142,142, filed on Apr. 2, 2015.

(51) Int. Cl.
| | | |
|---|---|---|
| *B23D 61/02* | (2006.01) | |
| *B23D 61/06* | (2006.01) | |
| *B27B 33/08* | (2006.01) | |

(52) U.S. Cl.
CPC ......... *B23D 61/065* (2013.01); *B23D 61/021* (2013.01); *B27B 33/08* (2013.01)

(58) Field of Classification Search
CPC .... B23D 61/021; B23D 61/065; B27B 33/08; B27B 33/12
USPC ................. 83/835, 836, 837, 838, 839, 840; 407/113, 114, 115, 116
See application file for complete search history.

(56) References Cited

U.S. PATENT DOCUMENTS

| | | | | |
|---|---|---|---|---|
| 2,913,024 A | | 11/1959 | Key | |
| 4,189,265 A | * | 2/1980 | Arnold | B23B 27/143 407/114 |
| 4,334,808 A | * | 6/1982 | Seidel | B23B 27/143 407/114 |
| 4,344,725 A | * | 8/1982 | Seidel | B23B 27/143 407/114 |
| 4,359,300 A | * | 11/1982 | Hazra | B23B 27/143 407/114 |
| 4,932,447 A | | 6/1990 | Morin | |
| 5,085,112 A | | 2/1992 | MacLennan | |
| 5,158,402 A | * | 10/1992 | Satran | B23C 5/202 407/113 |

(Continued)

OTHER PUBLICATIONS

Document: Timberblade (advertisement).(Sep. 2008). Southern Loggin? Times, 37(9),29. Published by Hatton-Brown Publishers Inc. in Montgomery AL, USA on a monthly basis and distributed widely in the USA.†

*Primary Examiner* — Joshua E Rodden
(74) *Attorney, Agent, or Firm* — Price Heneveld LLP

(57) ABSTRACT

A saw tooth including a body defining substantially opposed rear and front ends and an axial centerline extending between the rear and front ends, the body defining side faces joined to each other by body edge sections, each side face and each body edge section extending between the rear and front ends; edge cutting tips extending from the body at the front end and facing the direction of advance, each edge cutting tip being in prolongation of a respective one of the body edge sections; and side cutting tips extending from the body and facing the direction of advance, each of the side cutting tips being provided at the front end between two adjacent ones of the edge cutting tips in prolongation of a respective one of the side faces.

21 Claims, 7 Drawing Sheets

(56) References Cited

U.S. PATENT DOCUMENTS

| | | | |
|---|---|---|---|
| 5,232,319 A * | 8/1993 | Satran | B23C 5/202 407/113 |
| 5,307,719 A | 5/1994 | MacLennan | |
| 5,579,674 A | 12/1996 | Wildey | |
| 5,644,965 A | 7/1997 | MacLennan et al. | |
| 5,647,263 A | 7/1997 | Wildey | |
| 5,813,308 A | 9/1998 | Wildey et al. | |
| 6,200,077 B1 * | 3/2001 | Svenningsson | B23B 51/048 407/113 |
| 6,224,300 B1 * | 5/2001 | Baxivanelis | B23B 27/141 407/114 |
| 6,543,970 B1 * | 4/2003 | Qvarth | B23C 5/202 407/114 |
| 6,810,783 B1 | 11/2004 | Larose | |
| 7,150,215 B2 | 12/2006 | Krehel | |
| 7,241,083 B2 * | 7/2007 | Nada | B23B 27/065 407/113 |
| 7,713,006 B2 | 5/2010 | MacLennan et al. | |
| 8,025,465 B2 * | 9/2011 | Ishida | B23C 5/06 407/113 |
| 8,430,009 B2 † | 4/2013 | Micacchi | |
| 8,485,765 B2 * | 7/2013 | Kruszynski | B23B 27/141 407/113 |
| 2002/0002892 A1 * | 1/2002 | DiSabatino | A01G 23/091 83/835 |
| 2007/0059110 A1 * | 3/2007 | Choi | B23B 27/141 407/113 |
| 2007/0189861 A1 * | 8/2007 | Muren | B23B 27/007 407/113 |
| 2010/0247252 A1 * | 9/2010 | Hatta | B23C 5/109 407/42 |
| 2010/0303563 A1 * | 12/2010 | Fang | B23C 5/109 407/113 |
| 2011/0070038 A1 * | 3/2011 | Ishida | B23C 5/06 407/42 |
| 2012/0291919 A1 * | 11/2012 | Micacchi | A01G 23/091 144/241 |

\* cited by examiner
† cited by third party

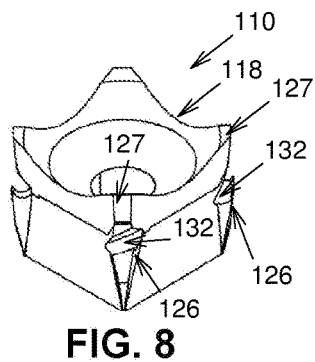 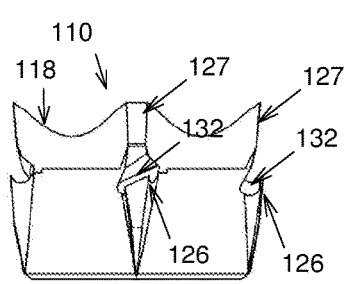 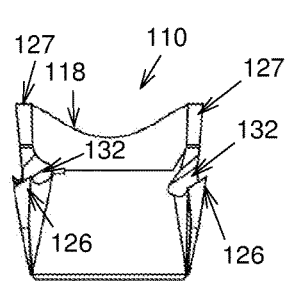
FIG. 8  FIG. 9  FIG. 10
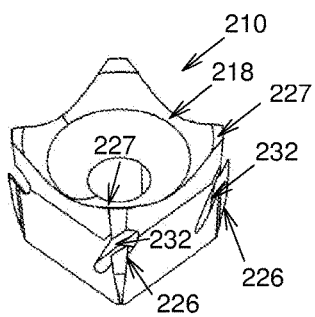 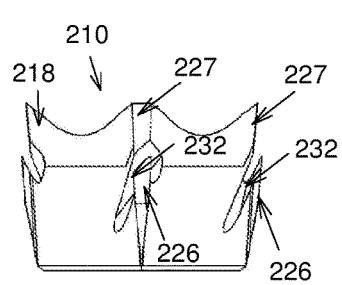 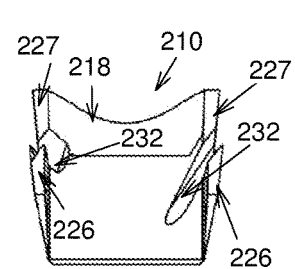
FIG. 11  FIG. 12  FIG. 13
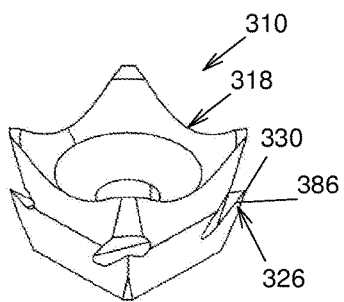 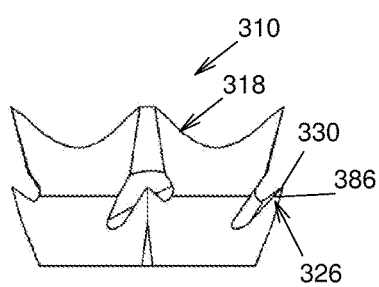 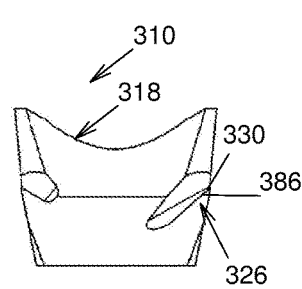
FIG. 14  FIG. 15  FIG. 16

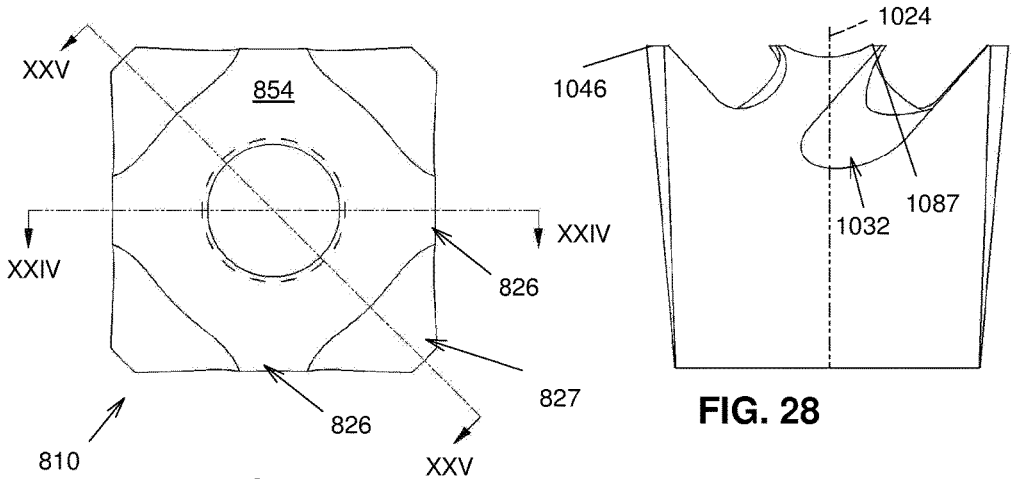
FIG. 23
FIG. 28
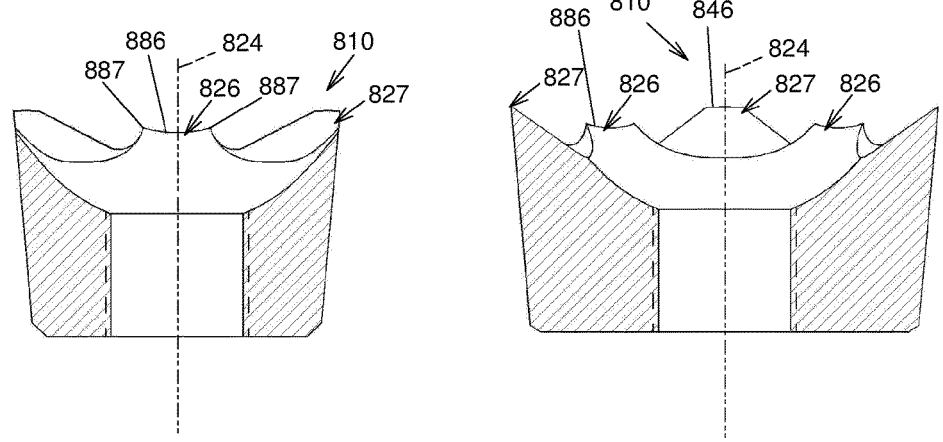
FIG. 24
FIG. 25
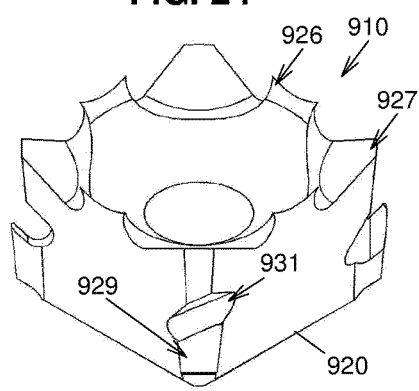
FIG. 26
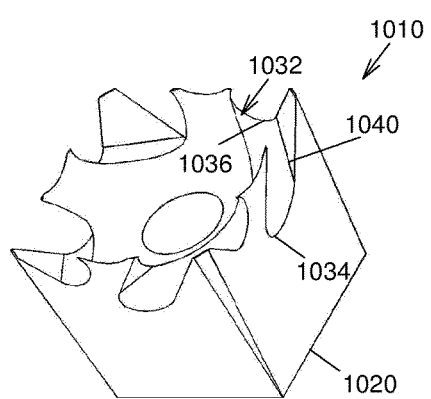
FIG. 27

SAW TOOTH

FIELD OF THE INVENTION

The present invention relates generally to the field of cutting, more particularly, to a saw tooth.

BACKGROUND

Saw teeth for circular saws of the type mounted on a feller head for a tree felling apparatus are known. An example of such saw teeth are of the replaceable type having four sides. The teeth can be rotated when the active cutting tips and edges become dull or worn so that unused ones are presented to the tree.

Saw teeth wear relatively quickly and may become rounded or dull. This may cause increased fuel consumption, decreased productivity, or poor cut quality, or all of them, and may tend to result in a need for maintenance. The outermost cutting tips of the teeth are also susceptible to damage from impact, such as when the teeth strike objects such as rocks and other debris during the felling of trees. This may also lead to a need for maintenance.

Some teeth have carbide wear plates with sharp corners at the cutting tips. These corners may tend to chip or break off easily when striking objects or debris. This may result in a loss of the cutting edge and in a loss of cutting efficiency. Other teeth may have flat plateaus at the cutting tips. These may be more durable but may become rounded or dull faster and may be less efficient at cutting tree fibers.

U.S. Pat. No. 8,430,009 to Micacci, issued Apr. 13, 2013, describes a saw tooth that includes front cutting tips and secondary trailing cutting tips, provided further rearwardly on the saw tooth. However, these secondary cutting tips are shaped so that the tree fibers that are cut thereby are evacuated in the direction of advance, which creates resistance to the forward motion of the tooth and consequently of the saw. Also, in this saw tooth, cutting tips are only provided over a relatively small portion of the circumference of the saw tooth, namely at the corners thereof.

In view of the above, there is a need in the industry for an improved saw tooth.

An object of the present invention is to provide such a saw tooth.

SUMMARY OF THE INVENTION

In a broad aspect, the invention provides a saw tooth, the saw tooth comprising: a body defining substantially opposed rear and front ends and an axial centerline extending between the rear and front ends, wherein, in operation, the front end leads the rear end in a direction of advance, the body defining side faces joined to each other by body edge sections, each body edge section extending between two adjacent side faces, each side face and each body edge section extending between the rear and front ends; edge cutting tips extending from the body at the front end and facing the direction of advance, each edge cutting tip being in prolongation of a respective one of the body edge sections; and side cutting tips extending from the body and facing the direction of advance, each of the side cutting tips being provided at the front end between two adjacent ones of the edge cutting tips in prolongation of a respective one of the side faces.

The invention may also provide a saw tooth wherein the body has a substantially polygonal transversal configuration.

The invention may also provide a saw tooth wherein the body includes four side faces and four body edge sections.

The invention may also provide a saw tooth wherein the saw tooth is repositionable relative to a circular saw disc by angular displacement about the axial centerline to present different ones of the side and edge cutting tips to a workpiece to be cut.

The invention may also provide a saw tooth wherein at least part of the body is tapered in a direction leading towards the rear end.

The invention may also provide a saw tooth wherein the body is entirely tapered in a direction leading towards the rear end.

The invention may also provide a saw tooth wherein the side faces as substantially planar.

The invention may also provide a saw tooth wherein each of the side cutting tips is centered between adjacent ones of the edge cutting tips.

The invention may also provide a saw tooth wherein the side cutting tips each define a straight cutting edge.

The invention may also provide a saw tooth wherein the side cutting tips each define a concave cutting edge.

The invention may also provide a saw tooth wherein the concave cutting edge is substantially arc segment shaped and terminates in a point at opposed ends thereof.

The invention may also provide a saw tooth wherein a number of edge cutting tips is equal to a number of body edge sections and to a number of side cutting tips.

The invention may also provide a saw tooth wherein the body defines a front surface at the front end, the front surface having a substantially bowl shaped configuration.

The invention may also provide a saw tooth wherein the body defines a mounting passageway extending along the axial centerline for receiving a fastener to mount the saw tooth to a circular saw disc.

The invention may also provide a saw tooth wherein the edge and side cutting tips define respectively edge and side cutting tips frontwardmost locations, the edge and side cutting tips frontwardmost locations being all in a common plane extending substantially perpendicular to the axial centerline.

The invention may also provide a saw tooth wherein the side cutting tips are proud of the edge cutting tips.

The invention may also provide a saw tooth wherein the side cutting tips are shy of the edge cutting tips.

The invention may also provide a saw tooth wherein the edge cutting tips each define a base at the junction between the edge cutting tip and the body, a substantially elongated gullet formed in the body extending along the base and defining a gullet longitudinal axis, the gullet defining substantially longitudinally opposed gullet first and second ends, the gullet separating each edge cutting tip from adjacent ones of the side cutting tips at the gullet first and second ends.

The invention may also provide a saw tooth wherein the gullet defines a gullet nadir line extending longitudinally therealong between the gullet first and second ends, the gullet nadir line joining locations along the gullet that are closest to the rear end at all longitudinal positions along the gullet, the gullet nadir line being equidistant to the rear end at the gullet first and second ends.

The invention may also provide a saw tooth wherein the gullet defines a gullet nadir line extending longitudinally therealong between the gullet first and second ends, the gullet nadir line joining locations along the gullet that are closest to the rear end at all longitudinal positions along the gullet, the gullet nadir line being closer to the rear end at the gullet first end than at the gullet second end.

The invention may also provide a saw tooth wherein each gullet has at least part thereof that intersects a line extending axially along one of side surfaces between the side cutting tip protruding from the one of the side surfaces towards the rear end.

Advantageously, the proposed saw tooth provides a larger number of cutting tips than prior art saw teeth, which improves the efficiency of the saw tooth.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 8, in a perspective view, illustrates an alternative embodiment of a saw tooth according to the present invention;

FIG. 9, in an oblique side elevation view, illustrates the saw tooth of FIG. 8;

FIG. 10, in a side elevation view, illustrates the saw tooth of FIG. 8;

FIG. 11, in a perspective view, illustrates an other alternative embodiment of a saw tooth according to the present invention;

FIG. 12, in an oblique side elevation view, illustrates the saw tooth of FIG. 11;

FIG. 13, in a side elevation view, illustrates the saw tooth of FIG. 11;

FIG. 14, in a perspective view, illustrates yet an other alternative embodiment of a saw tooth according to the present invention;

FIG. 15, in an oblique side elevation view, illustrates the saw tooth of FIG. 14;

FIG. 16, in a side elevation view, illustrates the saw tooth of FIG. 14;

FIG. 23, in a top plan view, illustrates the saw tooth of FIG. 22;

FIG. 24, in a side cross-sectional view, illustrates the saw tooth of FIG. 22, the cross-section being taken through the middle of the saw tooth along section line XXIV-XXIV of FIG. 23;

FIG. 25, in an oblique side cross-sectional view, illustrates the saw tooth of FIG. 22, the cross-section being taken through the middle of the saw tooth along section line XXV-XXV of FIG. 23;

FIG. 26, in a perspective view, illustrates yet an other embodiment of a saw tooth according to the present invention;

FIG. 27, in a perspective view, illustrates the saw tooth shown in FIG. 21;

FIG. 28, in a side elevation view, illustrates the saw tooth of FIGS. 21 and 27;

DETAILED DESCRIPTION

The term "substantially" is used throughout this document to indicate variations in thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Also, the present document describes a saw tooth 10 defining gullets 32. In the present document, the terminology axial refers to a direction along the centerline of the saw tooth 10, between its front and back. The terminology longitudinal refers to a direction along the gullet 32.

Figure 21:
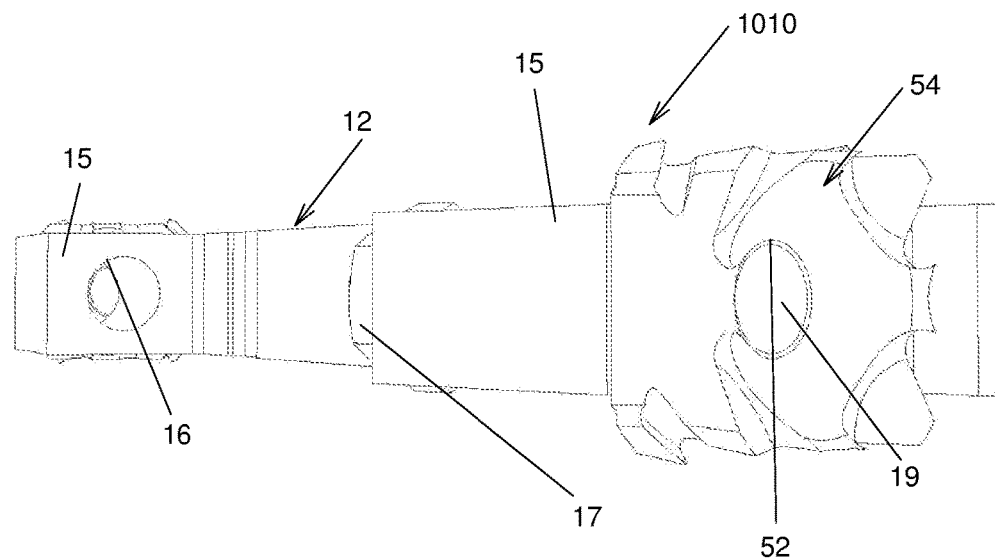
FIG. 21, in a partial perspective view, illustrates an yet another alternative saw tooth according to the present invention attached to a circular saw disc, the latter being partially shown.
Figure 22:
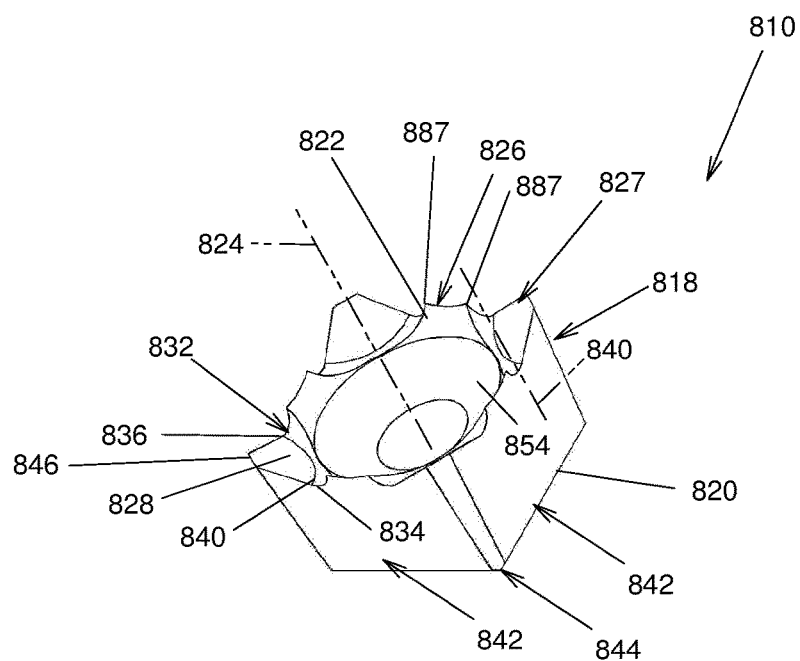
FIG. 22, in a perspective view, illustrates yet another saw tooth according to the present invention.

FIGS. 1 to 7 illustrate a saw tooth 10. As seen in FIG. 21, the saw tooth 10, or any other suitable saw tooth, such as saw tooth 1010 described in further details hereinbelow, is releasably mountable to a circular saw disc 12, for example the circular saw disc 12 of a feller head (not shown in the drawings). All the saw teeth described in the present document are similarly mounted to the saw disc 12, but the reader skilled in the art will appreciate that these saw teeth may be mounted to any other suitable saw discs, and that they can be modified to be mounted to other types of saw discs. Also, saw teeth similar to the saw tooth 10 and all the other saw teeth described herein may be used in other rotary tools.

The saw disc 12 is of a conventional type having the general form of a disc, and is mounted to be driven about an axis of rotation. The saw disc 12 defines a plurality of circumferentially spaced apart mounting blocks 15 protruding radially outwardly from the remainder of the saw disc 12. A block aperture 16 extends through each block 15, tangential to the circumferential direction. A fastener, for example a conventional bolt 19 having a head 17, is used to mount a saw tooth 1010, and similarly all the saw teeth described herein, to the mounting block 15.

Figure 1:
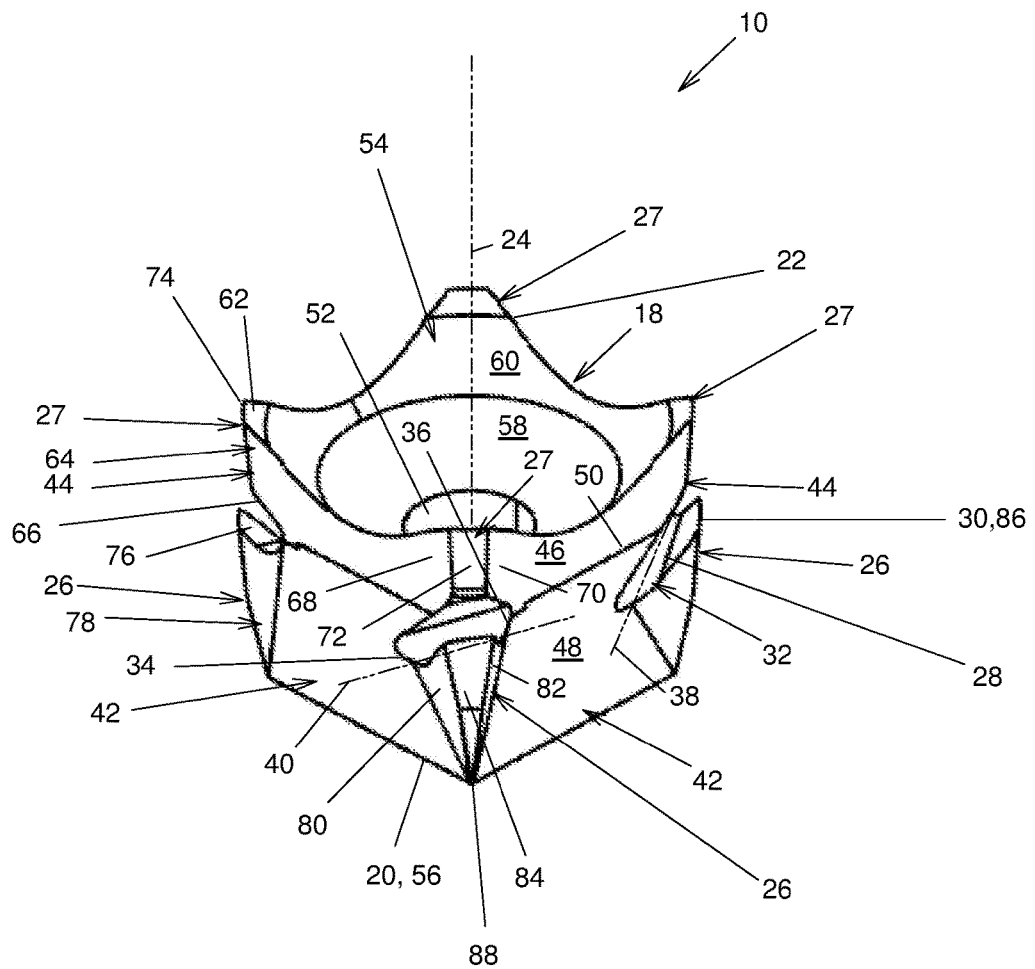
FIG. 1, in a perspective view, illustrates an embodiment of a saw tooth according to the present invention.
Figure 2:
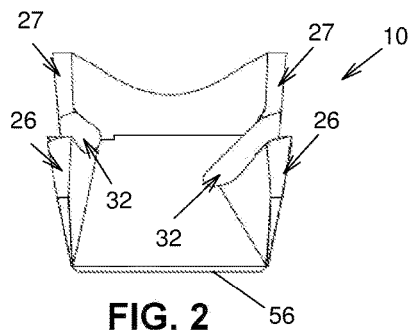
FIG. 2, in a side plan view, illustrates the saw tooth of FIG. 1.
Figure 3:
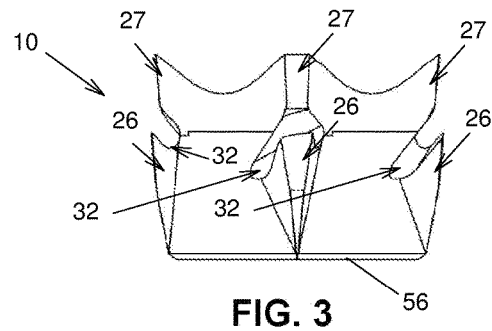
FIG. 3, in an oblique side elevation view, illustrates the saw tooth of FIG. 1.
Figure 4:
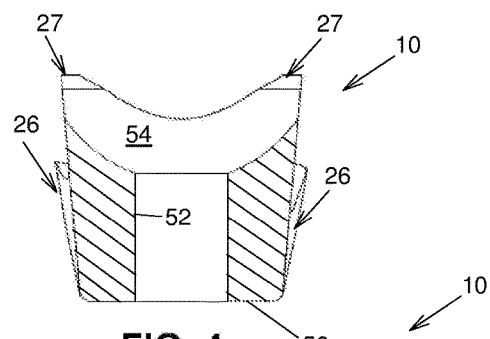
FIG. 4, in a side cross-sectional view, illustrates the saw tooth of FIG. 1, the cross-section being taken through the middle of the saw tooth.
Figure 5:
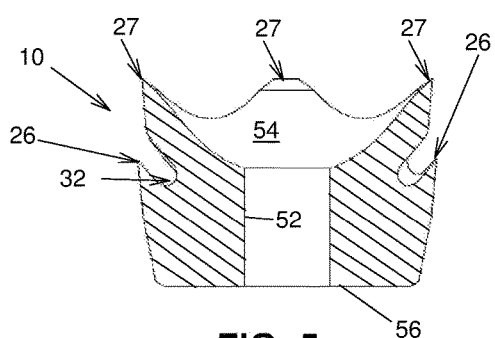
FIG. 5, in an oblique side cross-sectional view, illustrates the saw tooth of FIG. 1, the cross-section being taken through the middle of the saw tooth.
Figure 6:
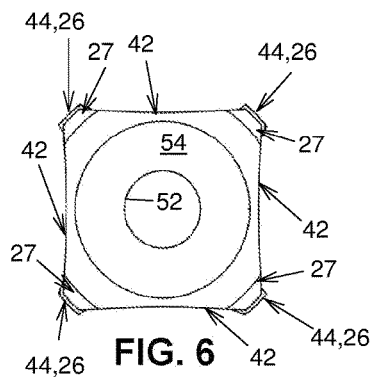
FIG. 6, in a top plan view, illustrates the saw tooth of FIG. 1.
Figure 7:
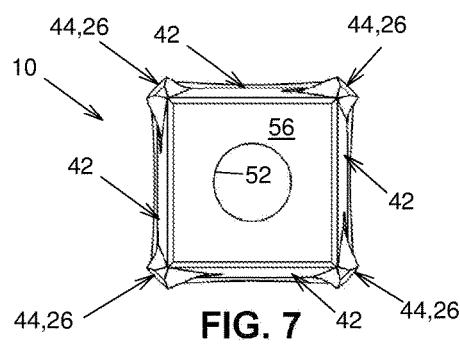
FIG. 7, in a bottom plan view, illustrates the saw tooth of FIG. 1.

Referring to FIG. 1, the saw tooth 10 includes a body 18 defining substantially opposed rear and front ends 20 and 22 and an axial centerline 24 extending between the rear and front ends. In operation, the front end 22 leads the rear end 20 in a direction of advance as the saw disc 12 (not shown in FIG. 1) turns. The saw tooth 10 also includes at least one cutting tip 26 extending from the body 18 and facing the direction of advance. The cutting tip 26 defines a cutting tip base 28 substantially adjacent to the body 18 and an opposed cutting tip free end 30. The cutting tip base 28 is rearwardly provided relative to the cutting tip free end 30. It should be noted that although a saw tooth 10 including a single cutting tip 26 is within the scope of the invention, the saw tooth 10 typically includes a plurality of cutting tips 26. The cutting tips 26 are hereinafter referred to as secondary cutting tips 26 for reasons that will become clearer hereinbelow.

A substantially elongated gullet 32 extends along the cutting tip 26 substantially adjacent to the cutting tip base 28. The gullet 32 defines substantially opposed gullet first and second ends 34 and 36 and a gullet longitudinal axis 38 therebetween. The gullet longitudinal axis 38 is typically slanted relative to planes perpendicular to the axial centerline 24. The gullet 32 is an elongated groove formed in the body 18. The gullet 32 also defines a gullet nadir line 40 extending longitudinally therealong between the gullet first and second ends 34 and 36. The gullet nadir line 40 joins the set of locations along the gullet 32 that are closest to the rear end 20 at all longitudinal positions along the gullet 32. The gullet nadir line 40 is closer to the rear end 20 at the gullet first end 34 than at the gullet second end 36. In other words, at any given point along the gullet nadir line 40, the only way to reach an adjacent point on the surface of the gullet 32 that would be closer to the rear end 20 than the given point would be to move on the surface of the gullet 32 along the gullet nadir line 40 towards the gullet first end. In yet other words, if the surface of the gullet is seen as a 3D surface with the axial centerline extending along the "z" axis, the gullet nadir line 40 represents the steepest descent along the gullet 32 when one starts from a minimum of the gullet 32 at the gullet second end. Thus, the gullet nadir line 40 is oriented at an angle relative to planes perpendicular to the axial centerline 24. This angle facilitates evacuation of debris generated by the saw tooth 10 in use towards the rear end 20 of the saw tooth 10.

The body 18 defines side faces 42 joined to each other by body edge sections 44. Each body edge section 44 extends between two adjacent side faces 42. Each side face 42 and each body edge section 44 extends between the rear and front ends 20 and 22. Thus, the body 18 has a substantially polygonal transversal configuration with the side faces 42 defining edges of the associated polygon and the body edge sections 44 defining the vertices of this associated polygon.

It should be noted that this polygonal configuration is only the general configuration of the body 18. The edges, corresponding to the transversal cross-sectional configuration of the body 18 at the side faces 42, may be straight, curved, concave or convex, among other possibilities. Likewise, in a polygon, the vertex is simply a point formed at the junction of the adjacent edges. However, in the body 18, the body edge sections 44 do not necessarily take the form of a simple straight line. Instead, the body edge section may have a structure that allows merging the side faces 42 to the secondary cutting tips 26, and to primary cutting tips 27 described hereinbelow. For example, the body edge sections 44 may take the form of a surface, planar or not, extending between the side faces 42 from which protrude generally convex primary and secondary cutting tips 27 and 26 and into which extends the gullet 32.

The secondary cutting tip 26 extends from one of the body edge sections 44 with the cutting tip base 28 provided rearwardly of the front end 22. Typically, but not necessarily, the cutting tip free end 30 is provided rearwardly of the front end 22. As mentioned hereinabove, the saw tooth 10 further includes at least one primary cutting tip 27 provided frontwardly relative to the secondary cutting tip 26.

The secondary cutting tip 26 typically trails the primary cutting tip 27. In other words, when the saw tooth is looked at from the front, as in FIG. 6, the secondary cutting tip 26 is aligned with the primary cutting tip 27. However, in alternative embodiments of the invention, the secondary cutting tip may be offset relative to the primary cutting tip. Still from the head on, or from the front, point of view, the secondary cutting tip 26 may be inwardly retracted (shy), flush, or protruding outwardly (proud) relative to the primary cutting tip 27.

Typically, but not necessarily, the number of secondary cutting tips 26 is equal to the number of primary cutting tips 27, which is equal to the number of body edge sections 44. Each secondary cutting tip 26 is provided at a respective one of the body edge sections 44. In some embodiments, as is conventional in the industry, the body 18 includes four side faces 42 and four body edge sections 44, and the saw tooth 10 is repositionable relative to the circular saw disc 12 by angular displacement about the axial centerline 24 to present different ones of the primary and secondary cutting tips 27 and 26 to a workpiece to be cut.

The body 18, primary cutting tips 27 and secondary cutting tips 26 may take any suitable configuration. The specific configuration illustrated in FIGS. 1 to 7 is described in further details hereinbelow.

Referring to FIG. 1, the side faces 42 each have side face first and second portions 46 and 48. The side face first and second portions 46 and 48 are each planar, but angled differently in space, and intersect at a side face bend 50 which takes the form of a straight edge. The side face first portion 46 extends from the front end 22 and the side face second portion 48 extends from the side face first portion 46. The body 18 has larger transversal cross-sectional area substantially adjacent to the front end 22 than substantially adjacent to the rear end 20. Typically, the body 18 generally tapers from the front end 22 to the rear end 20. To that effect, the side face first and second portions 46 and 48 are each slanted so that laterally opposed ones of the side face first portions 46 converge towards each other in a direction leading towards the rear end 20, and similarly for the side face second portions 48. This configuration is helpful in reducing friction between the saw tooth 10 and the object that is cut therewith.

The body 18 defines a front face 54 at the front end 22 and a rear face 56 at the rear end 20. The rear face 56 conforms to the shape of the socket 15 into which the saw tooth 10 is positioned in use. Typically, the rear face 56 is substantially flat. In some embodiments, the junction between the side face second portion 48 and the rear face 56 is chamfered, but other suitable junction shapes are within the scope of the invention. The front face 54 includes front face central and peripheral portions 58 and 60. The front face peripheral portion 60 is substantially concave and shaped like a generally annular portion of a concave bowl. This shape defines substantially concave peripheral edges at the junction between the front face peripheral portion 60 and side faces 42. The front face central portion 58 is substantially frustoconical and rearwardly recessed relative to the prolongation of the general concave shape of the front face peripheral portion 60.

The body 18 defines a mounting passageway 52 extending along the axial centerline 24 between the front and rear faces 54 and 56 for receiving the bolt 18 (not shown in FIG. 1) which mounts the saw tooth 10 to the circular saw disc 12. The mounting passageway 52 extends between the front face central portion 58 and the rear face 56. The mounting passageway 52 may be threaded or not, depending on the manner in which the saw tooth 10 is to be mounted. In the embodiment shown in the drawings, the mounting passageway 52 is threaded. For example, referring to FIG. 21, the bolt 19 extends through the block aperture 16 and is screwed in the mounting passageway 52. The mounting block 16 is clamped between the head 17 and the saw tooth 10 or 1010.

Returning to FIG. 1, the primary cutting tips 27 are formed at the front end 22. Each primary cutting tip 27 defines primary cutting tip front, side and rear surfaces 62, 64 and 66. The primary cutting tip front and rear surfaces 62 and 66 are opposed to each other, slanted relative to the axial centerline 24 and substantially flat. In some embodiments, the primary cutting tip front and rear surfaces 62 and 66 are substantially parallel to each other.

The primary cutting tip side surface 64 includes primary cutting tip side surface first, second and third portions 68, 70 and 72, all substantially flat and each extending between the primary cutting tip front and rear surfaces 62 and 66. The primary cutting tip side surface first and second portions 68 and 70 each extend in prolongation of a respective one of the side faces 42 flanking each primary cutting tip 27. The primary cutting tip side surface third portion 72 extends between the primary cutting tip side surface first and second portions 68 and 70. Similarly to the side surfaces 42, the primary cutting tip side surface third portion 72 is slanted so that its rear end is closer to the axial centerline 24 than its front end.

The primary cutting tips 27 each define a cutting edge 74 at the junction between the primary cutting tip front and side surfaces 62 and 64, or in other words at the free end thereof, for example at the junction between the primary cutting tip front surface 62 and the primary cutting tip side surface third portion 72. The cutting edge 74 is typically sharp.

The secondary cutting tips 26 each include secondary cutting tip front surface 76 and secondary tip side surface 78, which includes secondary tip side surface first, second and third portions 80, 82 and 84. There is no secondary cutting tip rear surface in the saw tooth 10 as the secondary cutting tips 27 end in a rearward point 88. However, it is within the scope of the invention to have such secondary cutting tip rear surface, as seen for example in FIG. 26.

The secondary cutting tip front surface 76 is substantially flat and faces the primary cutting tip rear surface 66. The secondary cutting tip front surface 76 extends from the gullet 32 to a secondary tip cutting edge 86 formed at the cutting tip free end 30, similar to the primary cutting tip cutting edge 74. The secondary tip side surface first, second and third portions 80, 82 and 84 each extend between the rearward point 88 and the secondary cutting tip front surface 76. The secondary cutting tip side surface first and second portions 80 and 82 extend from a respective one of the side faces 42 flanking each secondary cutting tip 26, at an angle relative thereto so that the secondary cutting tips 26 protrude from the side faces 42. The secondary cutting tip side surface third portion 84 extends between the secondary cutting tip side surface first and second portions 80 and 82 and include for example a pair of planar sections provided one behind the other. As in the primary cutting tips 27, the secondary cutting tip side surface third portion 84 is configured and shaped so that its rear end is closer to the axial centerline 24 than its front end.

The gullets 32 each extend between one of the primary cutting tips 27 and one of the secondary cutting tips 26 provided rearwardly relative thereto. More specifically, the gullets 32 join the primary cutting tip rear surface 66 and the secondary cutting tip front surface 76 to each other. For example, the gullet 32 has a substantially arcuate or U-shaped transversal cross-sectional configuration, transversal here referring to a plane perpendicular to the gullet longitudinal axis 38.

The orientation of the gullet 32 in space is as follows. The gullet 32 extends between adjacent ones of the side faces 42, and, as such, the gullet longitudinal axis 38 is oblique relative to these side faces 42. As mentioned previously, the gullet longitudinal axis 38 is also oblique relative to planes perpendicular to the axial centerline 14. Finally, the axial centerline 14 is also oblique relative to a plane extending from the gullet 32 that includes the gullet longitudinal axis 38 and that bisects the gullet 32, midway between the primary cutting tip rear surface 66 and the secondary cutting tip front surface 76.

The gullet 32 defines a pitch angle between the gullet longitudinal axis 38 and a plane perpendicular to the axial centerline 24 intersecting the gullet longitudinal axis 38. The pitch angle may take any suitable values, but values between 25 and 80 degrees have been found advantageous. For example, pitch angles from 25 to 50 degrees are advantageous to increase strength of the body 18. Pitch angles between 50 and 80 degrees increase efficiency of the body 18 in evacuating wood chips. A pitch angle of about 60 degrees is an example of a good compromise between strength and efficiency.

The gullets 32 may extend to any suitable depth in the body 18. For example, FIGS. 8 to 10 illustrate a saw tooth 110 having a body 118 with a relatively shallow gullet 132 extending between the primary and secondary cutting tips 127 and 126. For example, FIGS. 11 to 13 illustrate a saw tooth 210 having a body 218 with a relatively deep gullet 232 extending between the primary and secondary cutting tips 227 and 226.

Also, the secondary cutting tips 26 shown in FIGS. 1 to 7 have a straight secondary tip cutting edge 86. However, in alternative embodiments, as seen in FIGS. 14 to 16, an alternative saw tooth 310 has a body 318 with secondary cutting tips 326 having pointed tip free ends 330 and thus define substantially V-shaped cutting edges 386.

Figure 17:
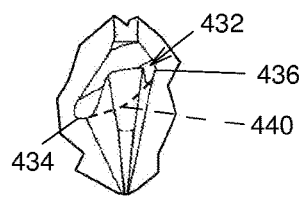
FIG. 17, in a perspective view, illustrates an alternative groove that may be formed in the saw teeth of FIGS. 1 to 16.
Figure 18:
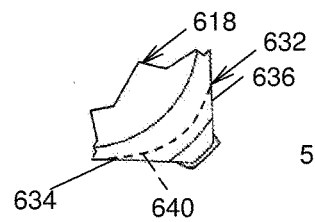
FIG. 18, in a perspective view, illustrates another alternative groove that may be formed in the saw teeth of FIGS. 1 to 16.

The gullet 32 of the saw tooth 10 shown in FIGS. 1 to 7 has a substantially rectilinear gullet nadir line 40. However, the gullet nadir line 40 may have any other suitable configuration. For example, FIGS. 17 and 18 illustrate respectively gullets 432 and 632 defining substantially arcuate gullet nadir lines 440 and 640. The gullet 632 is curved between the gullet first and second ends 634 and 636, with a radius of curvature that points towards the center of the corresponding body 618. The gullet 432 is curved in a different plane so that the gullet nadir line 440 has tangents that are angled differently relative to planes perpendicular to the centerline of the body (not shown in FIG. 17) at the gullet first and second ends 434 and 435.

Figure 19:
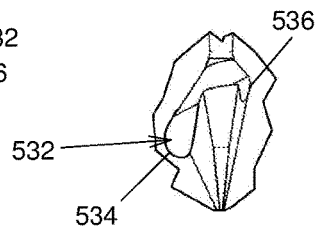
FIG. 19, in a perspective view, illustrates yet another alternative groove that may be formed in the saw teeth of FIGS. 1 to 16.

Also, the gullet 32 of the saw tooth 10 shown in FIGS. 1 to 7 has a substantially constant transversal cross-sectional area between the gullet first and second ends 34 and 36. However, other progressions of the transversal cross-sectional area between the gullet first and second ends 34 and 36 are within the scope of the invention. For example, in some embodiments, as seen in FIG. 19, a gullet 532 has a larger transversal cross-sectional area at the gullet first end 534 than at the gullet second end 536. In a very specific non-limiting embodiment of the invention, the gullet 532 tapers from the gullet first end 534 to the gullet second end 536. This taper may be advantageous as cutting the wood typically results in an increase in volume due to air that gets trap between wood chips. Thus, when wood chips progress from the front of the gullet 532, at the gullet second end 536, to the back of the gullet 532, at the gullet first end 534, the expanding gullet 532 accommodates this increase in volume.

In some embodiments, the elements of the saw tooth 10, namely the body 18, primary cutting tips 27 and secondary cutting tips 26 and the gullets 32 are all integrally formed in a single piece of metal. In other embodiments, the primary cutting tips 27, secondary cutting tips 26 or both are provided with a conventional ceramic or tungsten carbide element forming the cutting edges 74 and/or 86.

It should be noted that bodies 18 having both right handed and left handed pitches in the gullets 32 may be manufactured.

Also, in other embodiments, there could be a third or more rows of cutting tips trailing the primary and secondary cutting tips 27 and 26.

Figure 20:
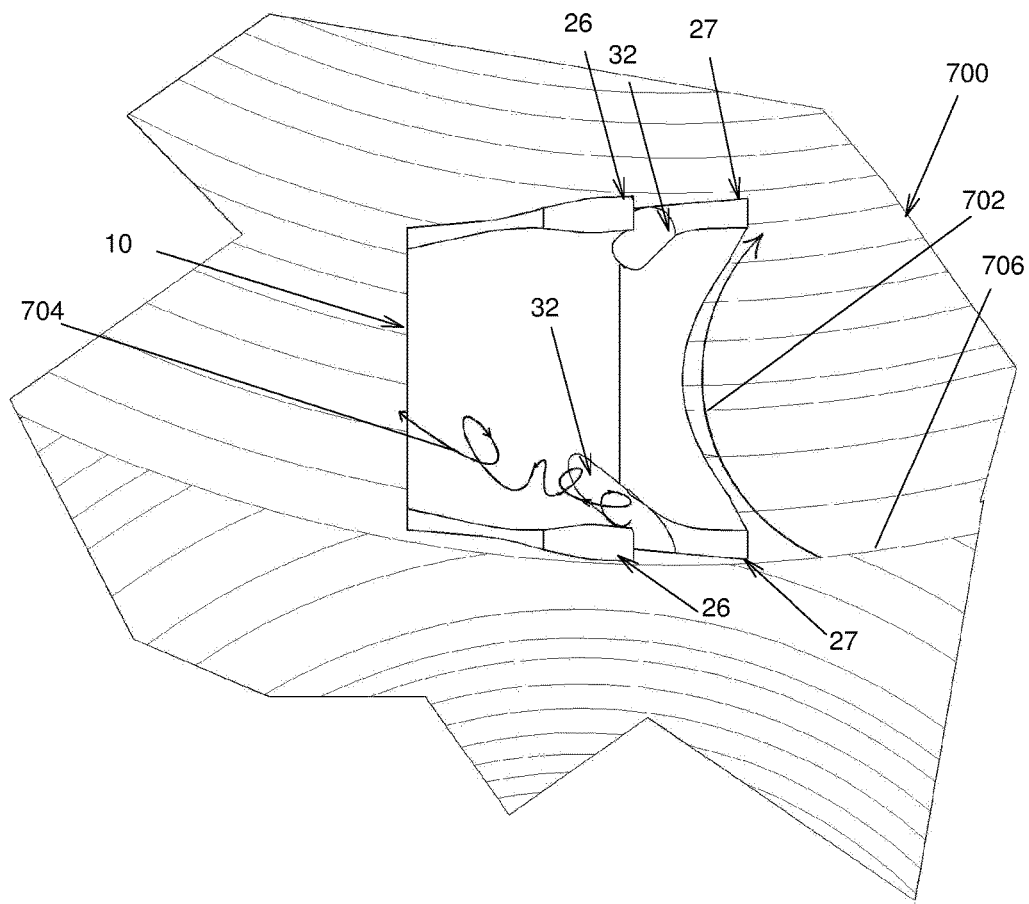
FIG. 20, in a side elevation environmental view, illustrates the saw tooth of FIG. 1 cutting through a tree.

In use, as seen in FIG. 20, the saw tooth 10 advances in the material to cut, for example a tree 700 and cuts a groove 706 thereinto. The material cut at the front of the saw tooth 10, by the primary cutting tips 27, is evacuated towards the front, as shown by with the arrow 702. The material cut by the secondary cutting tips 26 is evacuated through the gullet 32, as shown by arrow 704.

FIGS. 22 to 25 illustrate another saw tooth 810. The saw tooth 810 has a general shape similar to that of the saw tooth 10, except that cutting tips 826 and 827 are only provided at the front end 822 of the body 818 thereof. Since the saw teeth 10 and 810 are substantially similar, only the significant differences therebetween are described herein.

Similarly to the saw tooth 10, the saw tooth 810 defines a front end 822 and a rear end 820 and side faces 842 joined to each other by body edge sections 844. Edge cutting tips 827 extend from the body 818 at the front end 822 and facing the direction of advance, each edge cutting tip 827 being in prolongation of a respective one of the body edge sections 844. The edge cutting tips 827 are similar in function to the primary cutting tips 27 of the saw tooth 10. Side cutting tips 826 extend from the body 818 facing the direction of advance. Each of the side cutting tips 826 is provided at the front end 822 between two adjacent ones of the edge cutting tips 827 in prolongation of a respective one of the side faces 842. Typically, a number of edge cutting tips 827 is equal to a number of body edge sections 844 and to a number of side cutting tips 826. However, it is within the scope of the invention to have saw teeth 810 in which one or more of the side cutting tips 826 is omitted at one of the side faces 842. Similarly, it is within the scope of the invention to have saw teeth 810 in which one or more of the edge cutting tips 827 is omitted at one of the body edge sections 844.

Figure 30:
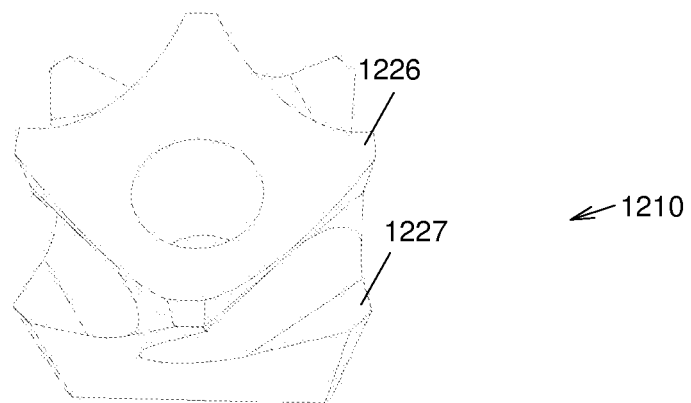
FIG. 30, in a perspective view, illustrates yet an other embodiment of a saw tooth according to the present invention.
Figure 29:
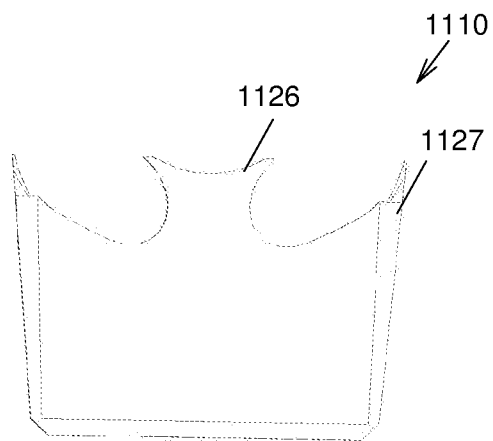
FIG. 29, in a side elevation view, illustrates yet an other embodiment of a saw tooth according to the present invention.

The edge and side cutting tips 827 and 826 define respectively edge and side cutting tips frontwardmost locations. For example, in the saw tooth 810, the edge cutting tips 827 have straight cutting edges 846 that are perpendicular to the axial centerline 824, and the edge cutting tips frontwardmost locations is thus the cutting edges 846. The side cutting tips frontwardmost location is at the points 887. In the saw tooth 810, the side cutting tips frontwardmost locations are rearwardly provided relative to the edge cutting tips frontwardmost locations. In other words, the side cutting tips 826 are shy of the edge cutting tips 827. However, in alternative embodiments of the invention, as seen in the saw tooth 1110 of FIG. 29, frontwardmost locations of the side cutting tips 1126 are frontwardly provided relative to the frontwardmost locations of the edge cutting tips 1127. In these embodiments, the side cutting tips 1126 are proud of the edge cutting tips 1127. FIG. 30 presents an even more pronounced version of a saw tooth 1210 in which the side cutting tips 1226 are proud of the edge cutting tips 1227. In yet other embodiments, as seen in FIG. 28, the side cutting tips frontwardmost locations 1087 are axially at the same level relative to the edge cutting tips frontwardmost locations 1046. In such embodiments, the edge and side cutting tips frontwardmost locations 1046 and 1087 are all in a common plane extending substantially perpendicular to the axial centerline 1024.

Typically, at least part of the body 818 is tapered in a direction leading towards the rear end 820. In some embodiments, as allowed by the absence of secondary cutting tips 26 that are found in the saw tooth 10, the body 818 is entirely tapered in a direction leading towards the rear end 820. In other words, each transversal slice of the body 818 is proud of all rearwardly located transversal slices of the body 818. In such embodiments, the side faces 842 may be substantially planar.

Typically, each of the side cutting tips 826 is centered between adjacent ones of the edge cutting tips 827. However, the side cutting tips could be offset relative to this central position in alternative embodiments. As seen for example in FIG. 24, the side cutting tips 826 each define a concave cutting edge 886. For example, the concave cutting edge 886 is substantially arc segment shaped and terminates in a point 887 at opposed ends thereof. However, in other embodiments the side cutting tips each define a straight cutting edge.

The body 818 defines a front surface 854 at the front end 822. The front surface 854 has a substantially bowl shaped configuration. Typically, gullets 832 are provided between the edge and side cutting tips 826 and 827. More specifically, the edge cutting tips 827 each define a cutting tip base 828 at the junction between the edge cutting tip 827 and the body 818. The gullet 832 is substantially elongated and formed in the body 818 extending along the base 828 and defining a gullet longitudinal axis 838. The gullets 832 define substantially longitudinally opposed gullet first and second ends 834 and 836, the gullets 832 separating each edge cutting tip 827 from adjacent ones of the side cutting tips 826 at the gullet first and second ends 834 and 836.

The gullet 832 defines a gullet nadir line 840 extending longitudinally therealong between the gullet first and second ends 834 and 836. The gullet nadir line 840 joins locations along the gullet 832 that are closest to the rear end 820 at all longitudinal positions along the gullet 832. In some embodiments, as in the saw tooth 810, the gullet nadir line 840 is equidistant to the rear end 820 at the gullet first and second ends 834 and 836. In other embodiments, as in the saw tooth 1010 seen in FIG. 27, the gullet nadir line 1040 of the gullet 1032 is closer to the rear end 1020 at the gullet first end 1034 than at the gullet second end 1036. In this embodiment, the gullet 1032 is thus oriented similarly to the gullet 32. Otherwise, the saw tooth 1010 seen in FIGS. 27 and 28 is similar to the saw tooth 810 except for the shape of its gullet 1032, which is described hereinabove.

The saw tooth 910 seen in FIG. 26 is similar to the saw tooth 810, except for the relative extent of the side and edge cutting tips 926 and 927, as noted hereinabove, and the presence of secondary cutting tips 929 and associated gullet 931, which are similar in shape and function to the secondary cutting tips 26 and gullets 32. Thus, the saw tooth 910 may be seen as combining the cutting tips of the saw teeth 10 and 810. FIG. 26 illustrates secondary cutting tips 929 that differ slightly from the secondary cutting tips 26 in that they do not extend to a rearward point 88 at the rear end 20, as in the saw tooth 10. Instead, the secondary cutting tips 929 are spaced apart from the rear end 920.

Various embodiments of a saw tooth and features thereof have been described hereinabove. The reader skilled in the art will understand that these various features from different ones of the saw teeth presented herein may be combined together in other combinations than those shown in the drawings and described herein.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A saw tooth, the saw tooth comprising:
   a body defining substantially opposed rear and front ends and an axial centerline extending between the rear and front ends, wherein, in operation, the front end leads the rear end in a direction of advance, the body defining side faces joined to each other by body edge sections, each one of the body edge sections extending between two adjacent one of the side faces, each one of the side faces and each one of the body edge sections extending between the rear and front ends;
   edge cutting tips extending from the body at the front end and facing the direction of advance, each one of the edge cutting tips being in prolongation of a respective one of the body edge sections, each one of the edge cutting tips defining a cutting tip base substantially adjacent to the body and an opposed cutting edge located forwardly from the cutting tip base;
   side cutting tips extending from the body and facing the direction of advance, each of the side cutting tips being provided at the front end between two adjacent ones of the edge cutting tips in prolongation of a respective one of the side faces, each one of the side cutting tips having a cutting edge extending along a portion of the respective one of the side faces; and
   elongated gullets, each one of the elongated gullets extending along a respective one of the edge cutting tips and substantially adjacent to the cutting tip base, the gullet defining substantially opposed gullet first and second ends opened on adjacent ones of the side faces.

2. The saw tooth as defined in claim 1, wherein the body has a substantially polygonal transversal configuration.

3. The saw tooth as defined in claim 2, wherein the side faces comprise four side faces and the body edge sections comprise four body edge sections.

4. The saw tooth as defined in claim 2, wherein the saw tooth is repositionable relative to a circular saw disc by angular displacement about the axial centerline to present different ones of the side and edge cutting tips to a workpiece to be cut.

5. The saw tooth as defined in claim 4, wherein at least part of the body is tapered in a direction leading towards the rear end.

6. The saw tooth as defined in claim 4, wherein the body is entirely tapered in a direction leading towards the rear end.

7. The saw tooth as defined in claim 1, wherein the side faces are substantially planar.

8. The saw tooth as defined in claim 1, wherein each of the side cutting tips is centered between adjacent ones of the edge cutting tips.

9. The saw tooth as defined in claim 1, wherein each one of the side cutting tips defines a straight cutting edge.

10. The saw tooth as defined in claim 1, wherein each one of the side cutting tips defines a concave cutting edge.

11. The saw tooth as defined in claim 10, wherein the concave cutting edge is substantially arc segment shaped and terminates in a point at opposed ends thereof.

12. The saw tooth as defined in claim 1, wherein a number of the edge cutting tips is equal to a number of the body edge sections and to a number of the side cutting tips.

13. The saw tooth as defined in claim 1, wherein the body defines a front surface at the front end, the front surface having a substantially bowl shaped configuration.

14. The saw tooth as defined in claim 1, wherein the body defines a mounting passageway extending along the axial centerline for receiving a fastener to mount the saw tooth to a circular saw disc.

15. The saw tooth as defined in claim 1, wherein the edge and side cutting tips define respectively edge and side cutting tips frontwardmost locations, the edge and side cutting tips frontwardmost locations being all in a common plane extending substantially perpendicular to the axial centerline.

16. The saw tooth as defined in claim 1, wherein the side cutting tips are proud of the edge cutting tips.

17. The saw tooth as defined in claim 1, wherein the side cutting tips are shy of the edge cutting tips.

18. The saw tooth as defined in claim 1, wherein each one of the cutting tip bases is located at a junction between a corresponding one of the edge cutting tips and the body, each one of the elongated gullets define a gullet longitudinal axis, and each one of the gullets separates a corresponding one of the edge cutting tips from adjacent ones of the side cutting tips at the gullet first and second ends.

19. The saw tooth as defined in claim 18, wherein each one of the gullets defines a gullet nadir line extending longitudinally therealong between the gullet first and second ends, the gullet nadir line joining locations along the gullet that are closest to the rear end at all longitudinal positions along the gullet, the gullet nadir line being equidistant to the rear end at the gullet first and second ends.

20. The saw tooth as defined in claim 18, wherein each one of the gullets defines a gullet nadir line extending longitudinally therealong between the gullet first and second ends, the gullet nadir line joining locations along the gullet that are closest to the rear end at all longitudinal positions along the gullet, the gullet nadir line being closer to the rear end at the gullet first end than at the gullet second end.

21. The saw tooth as defined in claim 1, wherein each one of the gullets has at least part thereof that intersects a line extending axially along one of side surfaces between a corresponding one of the side cutting tips protruding from the one of the side surfaces towards the rear end.

* * * * *